(12) United States Patent
Oaks

(10) Patent No.: US 12,155,720 B2
(45) Date of Patent: Nov. 26, 2024

(54) LOAD BALANCING AGENT

(71) Applicant: Oracle International Corporation, Redwood Shores, CA (US)

(72) Inventor: Scott Oaks, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/160,316

(22) Filed: Jan. 27, 2021

(65) Prior Publication Data

US 2022/0303337 A1 Sep. 22, 2022

(51) Int. Cl.
G06F 15/16 (2006.01)
H04L 67/01 (2022.01)
H04L 67/1017 (2022.01)
H04L 67/1036 (2022.01)

(52) U.S. Cl.
CPC .......... H04L 67/1017 (2013.01); H04L 67/01 (2022.05); H04L 67/1036 (2013.01)

(58) Field of Classification Search
CPC ...... G06F 9/5033; G06F 9/547; G06F 9/5077; G06F 9/5083; G06F 9/54; G06F 9/5072; G06F 2009/4557; G06F 9/4881; H04L 67/1006; H04L 67/1036; H04L 67/1004; H04L 67/1002; H04L 67/1012; H04L 67/01; H04L 67/11017; H04L 61/4511; H04L 61/58; H04L 61/09; H04L 61/59; H04L 67/1017
See application file for complete search history.

(56) References Cited

U.S. PATENT DOCUMENTS

| | | | |
|---|---|---|---|
| 7,574,499 B1* | 8/2009 | Swildens | G06F 9/505 709/202 |
| 2010/0333104 A1* | 12/2010 | Unnikrishnan | G06F 9/505 718/105 |
| 2011/0055312 A1* | 3/2011 | Purdy, Sr. | H04L 67/1021 709/230 |
| 2015/0281016 A1* | 10/2015 | Guerin | H04L 67/1004 709/224 |
| 2016/0316029 A1* | 10/2016 | Song | H04L 47/10 |

(Continued)

OTHER PUBLICATIONS

Manning "Chapter 4. on service discovery—Spring Microservices in Action", Jun. 2017 (Year: 2017).*

(Continued)

Primary Examiner — Oscar A Louie
Assistant Examiner — Messeret F Gebre
(74) Attorney, Agent, or Firm — Trellis IP Law Group, PC (57) ABSTRACT

A client-side load balancer replaces standard name serving functions. An operating system on client machine receives a command to start a client application. The command includes a command line argument (a switch) based on which the operating system also starts the client-side load balancer, which intercepts name service requests. The client-side load balancer controls a cache memory with a list of IP addresses of available servers that are associated with a URL for a particular service request. In response to successive name service requests for the URL, the client-side load balancer provides IP addresses from the list in a strictly repetitive order. The order may be a Round Robin order, or any permutation of a Round Robin order.

5 Claims, 7 Drawing Sheets

(56) References Cited

U.S. PATENT DOCUMENTS

2019/0007455 A1* 1/2019 Sheng ................ H04L 63/1416

OTHER PUBLICATIONS

Sim, "On gRPC Load Balancing", Feb. 2019 (Year: 2019).*
Sultanov, "Client-Side Load Balancing in GRPC Java", Nov. 2019 (Year: 2019).*
Sevenson, "Dynamic Aspect-Oriented Load Balancing in Java RMI", Jan. 1, 2020 (Year: 2020).*
Ribbon, "Client-Side Load Balancing with Ribbon", Dec. 2019 (Year: 2019).*
Spring, "Client Side Load Balancing using Spring Ribbon", Sep. 2018 (Year: 2018).*
Zongyu, "A predictive modified round robin scheduling algorithm for web server clusters", 2015 (Year: 2015).*
Ravichandiran, "Analysis, Modification, and Implementation(AMI) of Scheduling Algorithm for the IEEE 802.116e (Mobile WiMAX)" ( Year: 2010).*
Velickko, "Service Discovery in Kubernetes: Combining the Best of Two Worlds" (Year: 2020).*
Richardson, "Service Discovery in a Microservices Architecture" (Year: 2015).*
G. Chavan, S. Acharya, S. Bhattacharya and H. Inam, "Damping of power oscillations induced by photovoltaic plants using distributed series-connected FACTS devices," 2017 IEEE Industry Applications Society Annual Meeting, Cincinnati, OH, USA, 2017 , pp. 1-7 (Year: 2017).*
Hung-Chang Hsiao, I-Ta Lin, & Liao, H. (2008). Load balancing in peer-to-peer networks based on sampling system states doi:http://dx.doi.org/10.1109/EUC.2008.12 (Year: 2008).*
A. Boukerche, Ming Zhang and Hengheng Xie, "An adaptive dynamic load balancing for large scale distributed and virtual simulations," 2009 IEEE International Conference on Virtual Environments, Human-Computer Interfaces and Measurements Systems, Hong Kong, 2009, pp. 96-100 (Year: 2009).*

\* cited by examiner

LOAD BALANCING AGENT

TECHNICAL FIELD

The disclosed embodiments relate generally to tools and methods used in load balancing agents, and in particular to those for the Domain Name System (DNS) and Lightweight Directory Access Protocol (LDAP).

BACKGROUND

Data centers employ large numbers of physical and virtual servers to provide services over Internet via protocols such as Hypertext Transfer Protocol (HTTP), Hypertext Transfer Protocol Secure (HTTPS), File Transfer Protocol (FTP), File Transfer Protocol Secure (FTPS), etc. A service is called using either an Internet Protocol (IP) address or a Uniform Resource Locator (URL) associated with the IP address. The URL follows the Domain Name System (DNS), a hierarchical decentralized naming system for computers, services, and other resources connected to Internet or to a private network. It has a form such as oss.oracle.com, or more generally, <sub_N> . . . <sub_2>.<sub_1>.<domain_name>. The <domain_name>, for example oracle.com, provides access to all services the domain offers, and the path started by <sub_1> and ended by <sub_N> provides access to hierarchically more specific levels, or subdomains. DNS servers and LDAP servers provide name services to translate a URL or a part of a URL into an IP address.

A user who wants to access a service provides the relevant URL to, for example, a web browser. The web browser sends the URL plus a return address to an IP address of an Internet service provider (ISP). A DNS server at the ISP IP address determines the top-level domain (TLD), in this example, corn from among other TLDs such as info, net, org, edu, gov, mil, and country specific TLDs. The ISP forwards the URL and return address to the IP address of a DNS server of the organization that manages traffic for this TLD. The organization, in turn, forwards the URL and return address to an IP address of a DNS server of the domain owner (in this case, Oracle). The DNS determines the first subdomain <sub_1> and forwards the information to a DNS server for the first subdomain, etc.

Ultimately, the information reaches a server providing the full address the user requested. That address is returned, and the user can then contact the desired service, for example the graphical user interface (GUI) offered by a webpage.

Some services require little compute power, for instance providing the content of a static webpage. Other services, including for instance Software-as-a-Service (SaaS), may require large amounts of compute power. Thus, it is common that multiple servers act as endpoint for the same URL, providing the same services to multiple customers. A load balancing (LB) system is needed to distribute tasks over the available servers. The most common LB algorithm, called Round Robin, simply rotates entries from a list of available servers. Round Robin is not the most efficient algorithm, and other algorithms instead consider the current load of a server, what its response time is, what its capacity is, what bandwidth it has available, how many packets it has received, and/or other metrics. However, Round Robin is the most common algorithm, and it is often slightly modified to take one of the mentioned metrics into account. Thus, an LB agent may use the Round Robin algorithm, but regularly deviate from it.

Kubernetes is a system for automating deployment, scaling, and management of computer applications. It is highly useful for SaaS and enterprise applications, which typically must be available 24/7, uninterrupted by updates, other maintenance, or machine failure. It containerizes an application, and spreads services over three or more pods in a cluster of physically different nodes. If a pod is unavailable, due to machine failure or maintenance, the other pods keep providing the service without interruption. A cluster can be deployed on physical or virtual servers. The pods are located on different physical machines to provide protection against machine failure.

The Kubernetes system has no intrinsic problem with Round Robin load balancing, and deviations from the strict Round Robin cyclic order help it to efficiently manage most applications. However, for applications that are very compute intensive, those deviations can negatively affect performance. For example, Oracle's Data Catalog service partitions an indexing request into three units meant for pods on three different nodes in a cluster. Each pods will then use all available compute cycles to process the indexing request unit. If each indexing request unit ends up on a different node, the operation may take N elapsed seconds. But, in a cluster with three pods on three nodes, about one third of the time two requests will end up on the same node, and total elapsed time will be 2*N seconds. About one ninth of the time three requests will end up on the same node, and the total elapsed time will be 3*N seconds.

Kubernetes with SaaS or enterprise software is one example of a system that may run into performance problems in this manner. Other environments, for example LDAP, may have a similar problem. Many commercial DNS servers and load balancers do not provide strict Round Robin ordering, thus causing performance problems for some compute-intensive applications.

Figure 1:
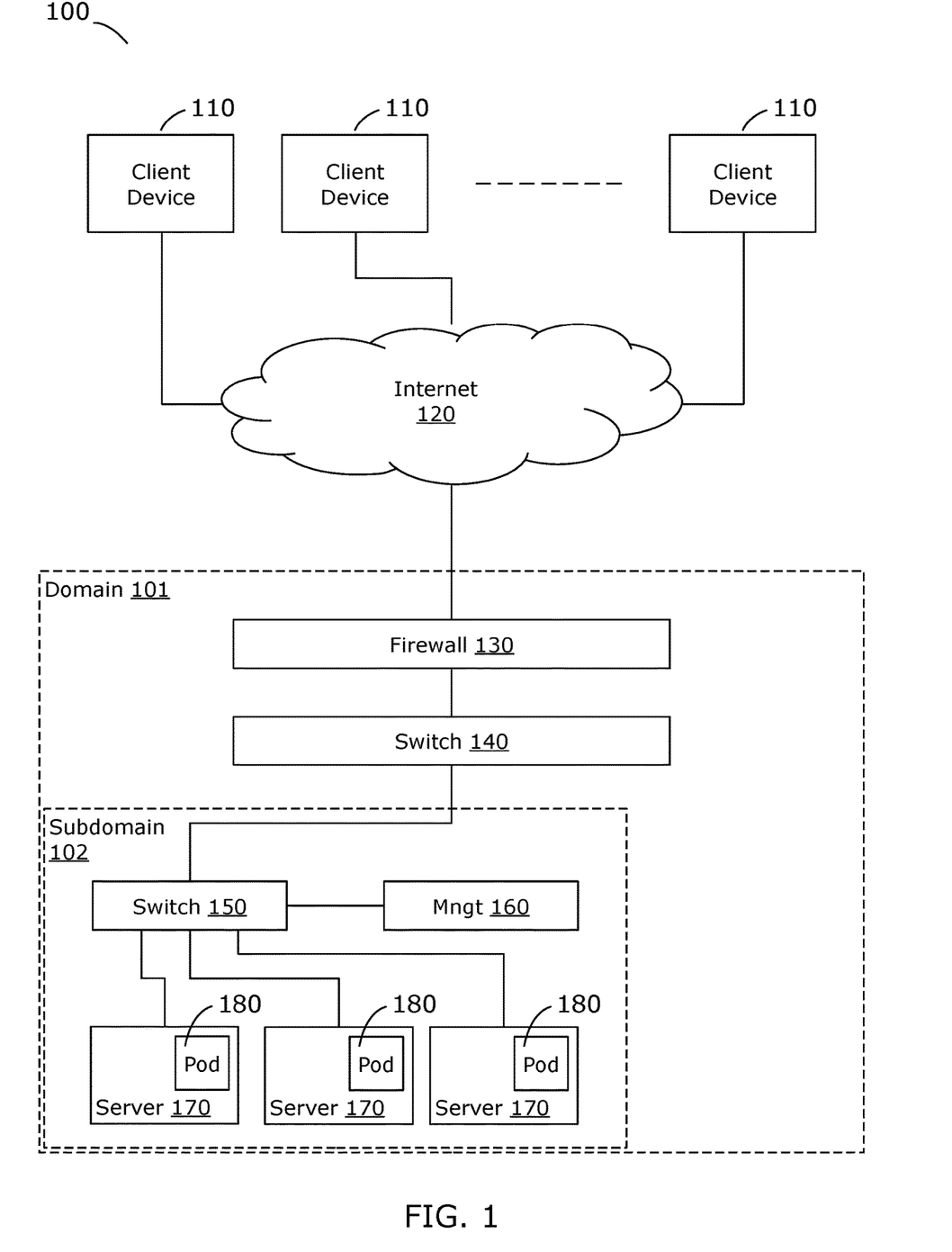
FIG. 1 illustrates an example network environment used for running software applications remotely.

FIG. 1 illustrates an example network environment 100 used for running software applications remotely. Network environment 100 includes at least one client device 110 that communicates through a network 120, for example Internet, with servers in a domain 101 that may comprise a subdomain 102. Domain 101 may be protected from intrusions by firewall 130, and it may route service requests and data from client device 110 to subdomain 102 via switch 140. Subdomain 102, which may also include protective firewalls, includes switch 150 that routes the service requests and data to an available server 170. There may be multiple server 170 machines, and traffic manager 160 may include a load balancer to more or less evenly distribute service requests and data to the multiple server 170 machines. Each server 170 may include one or more pods 180 to containerize a server application, such as is usual in for example Kubernetes systems. A server 170 machine may be physical or virtual, and subdomain 102 may include any number of physical and virtual server 170 machines. Domain 101 may have any number of subdomains, and subdomains may be hierarchical. Alternatively, domain 101 may not have a subdomain, and switch 140 and switch 150 may be combined into a single switch, directly or indirectly coupled with traffic manager 160, and the multiple server 170 machines.

Figure 2:
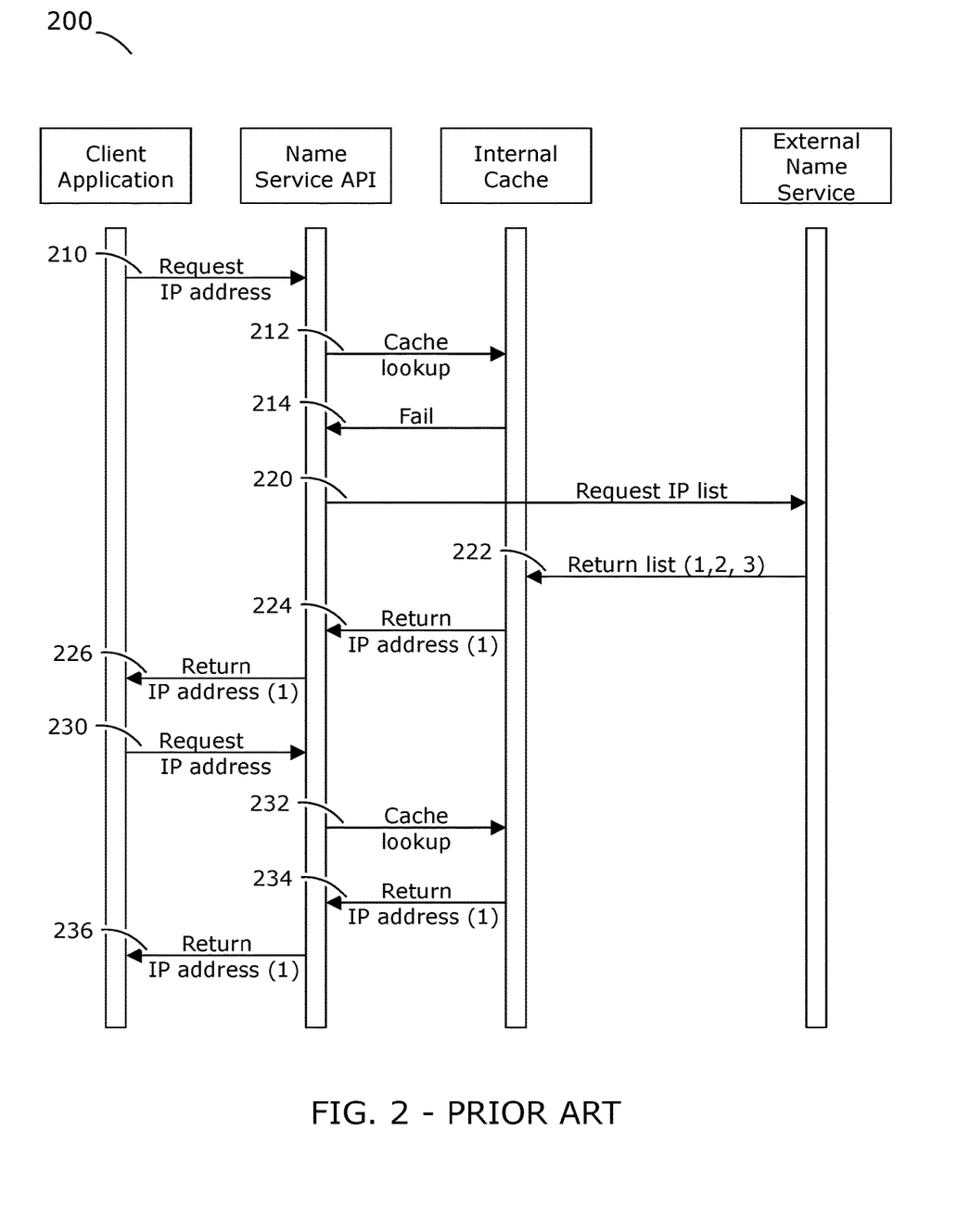
FIG. 2 illustrates a conventional DNS resolution method for hosting software applications.

FIG. 2 illustrates a conventional DNS resolution method 200 for hosting software applications. It is assumed here that a client application (for example, a Java client) runs on a client device, and needs to access a host server for a remote service. The client application may run in a development environment for building applications (e.g., Java Development Kit (JDK)), in a runtime environment (e.g., Java Runtime Environment (JRE)), or in any other environment that offers a name service application programming interface (API) with local cache. The environment provides an API that includes an interface to software code with network access operations. In the case of Java, the InetAddress object provides a name service interface; more specifically, it provides a method to determine the IP address of a host, given the host's name. To perform this service, InetAddress may access the JDK or JRE internal cache, or it may escalate the name service request to an available name server, such as a DNS server or an LDAP server. DNS resolution method 200 typically has the following steps.

Step 210—the client application requests an IP address from its name service API. It provides the name service API a URL and expects to receive an IP address in return. Step 212—the name service API looks up the URL in its internal cache. Step 214 the internal cache fails to find the URL and informs the name service API. Step 220—the name service API requests an external name service (for instance, a DNS or LDAP server) for a list of IP addresses associated with the URL. Step 222—the external name service provides a list of IP addresses associated with the URL. For example, there may be three IP addresses in the list. The list (or its first entry) is stored in the internal cache. Step 224—the internal cache provides the first IP address of the list to the name service API. Step 226—the name service API returns the first IP address of the list to the client application. Step 230—some time later, the client application again requests an IP address for the URL from the name service API. Step 232—the name service API looks it up in its internal cache and finds the first entry of the list of IP addresses. Step 234 the name service API retrieves the first IP address from the list. Step 236—the name service API returns the first IP address to the client application. In this case, the name service API provides no load balancing at all, since that is presumed to take place close to the actual servers that are available, rather than at the application level. Or the name service API might do some load balancing, but it may not be aware of the client application's need to use a strict Round Robin sequence. Either case results in performance loss for the client application.

Figure 3:
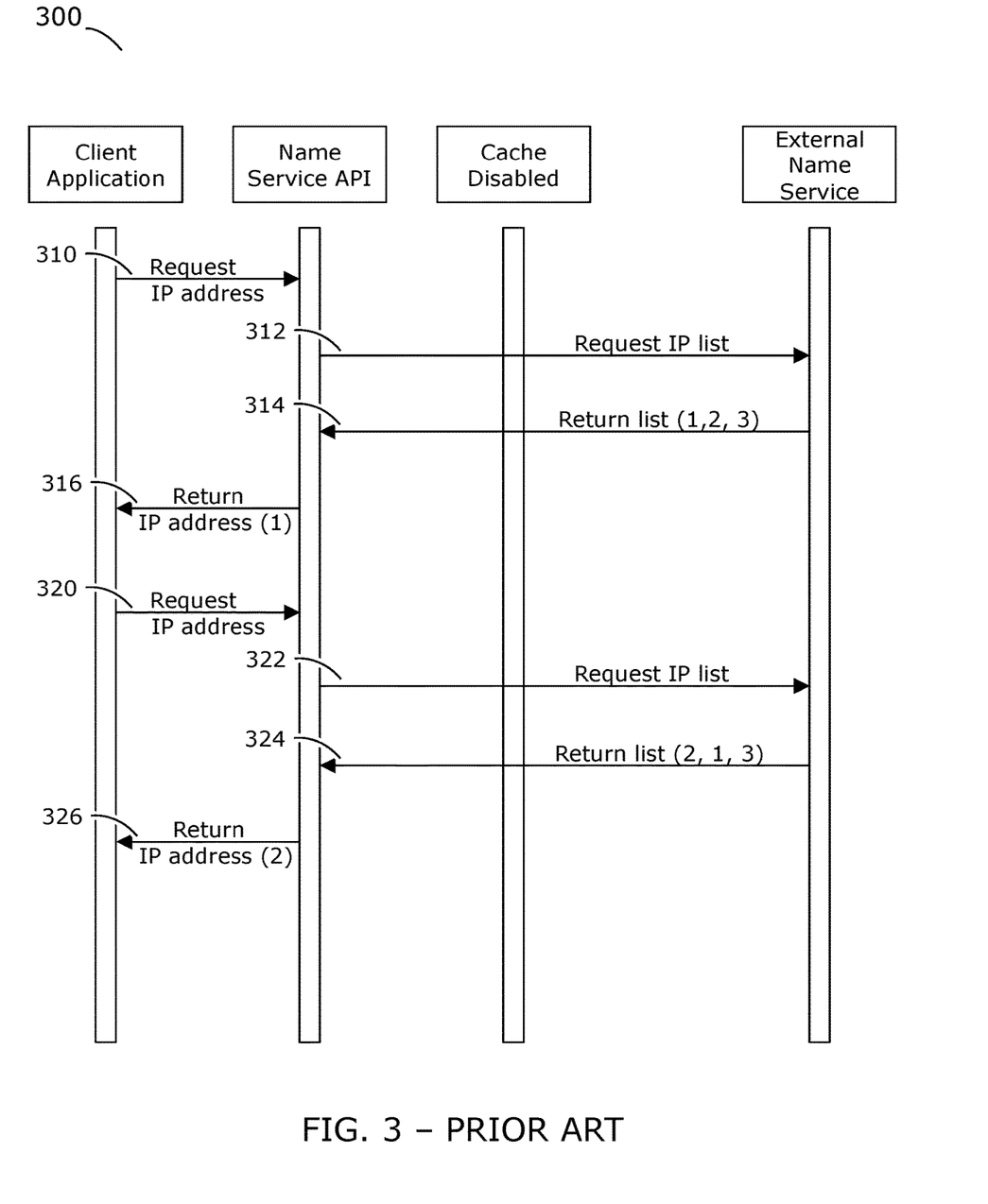
FIG. 3 illustrates another conventional DNS resolution method for hosting software applications.

FIG. 3 illustrates another conventional DNS resolution method 300 for hosting software applications. In this case, the client application has configured the name service API to disable its internal cache. DNS resolution method 300 typically includes the following steps.

Step 310—the client application requests an IP address from its name service API. It provides the name service API a URL and expects to receive an IP address in return. Step 312—the name service API ignores its internal cache and directly requests an external name service for a list of IP addresses associated with the URL. Step 314—the external name service provides a list of IP addresses associated with the URL. For example, there may again be three IP addresses in the list. Step 316—the name service API returns the first of the three IP addresses in the list to the client application. Step 320—some time later, the client application again requests an IP address for the URL from the name service API. Step 322—the name service API ignores its internal cache and directly requests the external name service for a list of IP addresses associated with the URL. Step 324—the external name service provides a list of IP addresses associated with the URL. These may be the same three IP addresses provided in Step 314, but their order may be different. For example, this time the first IP address coincides with the second IP address of the earlier list. Step 326—the name service API returns the first of the received three IP addresses to the client application. This IP address, in the example, coincides with the second IP address of the earlier list. While that would be better for the performance of the client application, there is no guarantee that the external name service provides its results according to a Round Robin algorithm, let alone in a strict Round Robin fashion. Therefore, the overall performance of the client application may still be suboptimal.

Another solution to the problem is provided by custom libraries that support client-side load balancing for specific circumstances. These libraries require that the application be written to a specific API like the Netflix Ribbon library, which in turn requires the application to make specific HTTP calls. This makes the application dependent on the library, which often requires using a specific service provider or proprietary service (e.g., the Netflix Eureka service discovery, rather than standard DNS or Kubernetes service discovery). These libraries are also not protocol independent.

Unless otherwise indicated herein, elements described in this section are not prior art to the claims and are not admitted being prior art by inclusion in this section.

SUMMARY

It is common in a data center that multiple servers service the same Internet domain, and act as an endpoint for the same URL. A load balancing system distributes tasks over the available servers. The most common LB algorithm, called Round Robin, simply rotates successive entries from a list of available servers. Most LB systems deviate from a strict Round Robin sequence to make the algorithm more effective. However, in some specific cases these deviations are counterproductive and decrease the system's performance. For example, for some requests that are compute intensive and that may be broken up in smaller pieces, deviation from a strict Round Robin sequence may result in performance loss.

Embodiments of the invention provide a client-side solution to this problem. The solution is protocol independent (HTTPS, gRPC, and so on) and supports DNS as well as LDAP and similar systems. The solution is, in many embodiments, backwards compatible with existing client applications, requiring no modification to the client application. It can be deployed by simply adding a module (such as a .jar file) to an API or to the client application, rather than by modifying API methods that may already be in widespread use. Embodiments can be used by starting a client application with a new command line argument.

In a first aspect, an embodiment of the invention provides a method for load balancing. The method starts a client application on a client machine, and a load balancer is at the client site. The client-side load balancer continually intercepts client application name serving requests, replacing standard or default name serving operations. The client application splits a service request in multiple chunks. The client-side load balancer controls a cache memory that stores a list IP addresses of available servers associated with a URL that is included in the split name service request. In response to successive name service requests for the URL, the client-side load balancer provides IP addresses from the list in a strictly repetitive order.

The client-side load balancer may be started by using a dedicated command line argument while starting the client application. Using the client-side load balancer may be based on function overriding, or using a custom resolver, or using reflection. It may be based on intercepting a library call, and the client-side load balancer may be comprised in a custom library.

A Java application may comprise the client application, and the client-side load balancer may be a Java agent. The strictly repetitive order may be a Round Robin order or a permutation of a Round Robin order.

In a second aspect, an embodiment provides a non-transitory computer-readable storage medium with instructions to determine if a client application command line argument includes a switch to import a load balancing agent and/or determine if an operating system has been directed to replace a library for the client application. Based on this determination, a client-side load balancer is used for the client application instead of a standard or default name service function. The client-side load balancer continually intercepts client application name service requests and replaces the standard or default name service function. The client-side load balancer controls a cache memory that stores a list of available server IP addresses associated with a unified resource locator (URL) included in a name service request; and returns IP addresses in the list in a strict repetitive order to the client application.

In a third aspect, an embodiment provides a system for client-side load balancing. The system includes a client machine and a non-transitory memory with instructions for standard or default name service operations and with instructions for client-side load balancer operations. The client machine runs an operating system that is configured to determine if a first condition is met. When the first condition is not met, the operating system gives a client application access to the instructions for standard or default name service operations. When the first condition is met, the operating system gives the client application access to the instructions for the client-side load balancer operations. The client-side load balancer is configured to store in a cache memory a list of available server IP addresses associated with a unified resource locator (URL) included in a name service request from the client application, and the client-side load balancer is configured to, in response to a name service request from the client application, return IP addresses in the list in a strict repetitive order. The first condition may comprise that a client application command line argument includes a switch to import the client-side load balancer. In some embodiments, the first condition comprises that the operating system has been directed to replace a library for the client application. The strict repetitive order may be a Round Robin order, or a permutation of a Round Robin order.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

In the figures, like reference numbers may indicate functionally similar elements. The systems and methods illustrated in the figures, and described in the Detailed Description below, may be arranged and designed in a wide variety of different embodiments. Neither the figures, nor the Detailed Description, are intended to limit the scope as claimed. Instead, they merely represent examples of different embodiments of the invention.

DETAILED DESCRIPTION

Terminology

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be digital, galvanic (in this context meaning that a direct electrical connection exists), capacitive, inductive, electromagnetic, optical, or through any other process allowed by physics.

The term "server" and "client" generally refer to separate systems that provide and consume information, respectively. A client may request a server for information, and the server may respond with the requested information. Additionally, a client may provide a server information, which the server may store in, for example, a database, for later use. The terms "client" and "server" are relative, and in some cases the roles may switch. However, the server is often considered to be a larger system serving multiple clients, which may be relatively smaller systems.

API—Application Programming Interface
    DNS—Domain Name System
    FTP—File Transfer Protocol
    FTPS—File Transfer Protocol Secure
    gRPC—Google's Remote Procedure Calls
    HTTP—Hypertext Transfer Protocol
    HTTPS—Hypertext Transfer Protocol Secure
    IP address—Internet Protocol address
    JDK—Java Development Kit
    JRE—Java Runtime Environment
    LB—load balancing
    LDAP—Lightweight Directory Access Protocol
    SaaS—Software-as-a-Service
    TLD—top-level domain
    URL—Uniform Resource Locator

DESCRIPTION

Data centers employ large numbers of physical and virtual servers to provide services over Internet via protocols such as HTTP, HTTPS, FTP, FTPS, etc. A service is called using either an IP address or a URL associated with the IP address. The URL follows the DNS, a hierarchical decentralized naming system for computers, services, and other resources connected to Internet or to a private network. Data centers perform load balancing to distribute service requests over multiple parallel servers that may all provide the same services that are accessible through a URL. There are many load balancing algorithms to prevent bottlenecks and optimize the overall data center performance. The most popular algorithm, called Round Robin, cycles through a list of IP addresses of available servers for a given URL. However, in most cases some optimization is performed, and the algorithm may not provide a strict cyclic sequence. For most types of service requests this approach works well, but for some requests that are compute intensive and that may be broken up in smaller pieces, deviation from a strict Round Robin sequence may result in performance loss.

Embodiments of the invention provide a client-side solution to this problem. The solution is protocol independent (HTTPS, gRPC, and so on) and supports DNS as well as LDAP and similar systems. The solution is, in many embodiments, backwards compatible with existing client applications, requiring no modification to the client application. It can be deployed by simply adding a module (such as a .jar file) to an API or to the client application, rather than by modifying API methods that may already be in widespread use. Embodiments can be used by starting a client application with a new command line argument.

Figure 4:
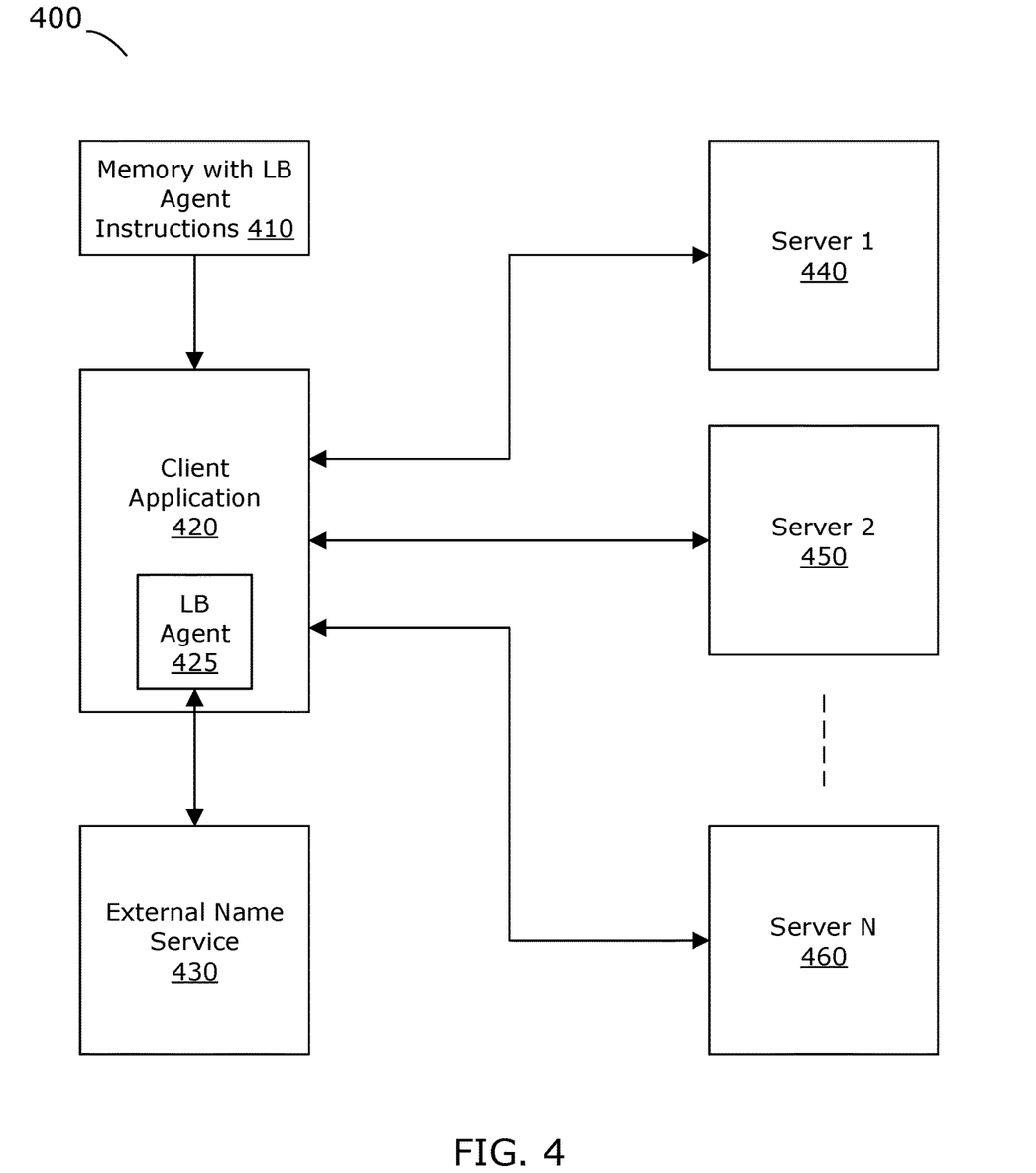
FIG. 4 illustrates an architecture with a client application using services on multiple parallel servers according to an embodiment of the invention.

FIG. 4 illustrates an architecture 400 with a client application using services on multiple parallel servers according to an embodiment of the invention. Architecture 400 includes non-transitory memory 410 with instructions making up load balancing agent 425, client application 420 running on a network node coupled with or including non-transitory memory 410, external name service 430, and N servers (server 440, server 450, . . . server 460). The node running client application 420 may be in the same geographic location as server 440 through server 460, or it may be in a different geographic location. The servers server 440 through server 460 may be in one geographic location, or be spread over multiple locations. The external name service 430 may be a DNS, LDAP or similar server. Load balancing agent 425 may be a software module, library, file, or other entity that comprises a set of software instructions performing operations as described herein, and as detailed herein with reference to FIGS. 5 and 6. In some embodiments, client application 420 may comprise a Java application running in a JRE or JDK, and load balancing agent 425 may be a Java agent. In some embodiments, load balancing agent 425 may be bundled with client application 420 at design time, or at the time of deployment. In other embodiments, load balancing agent 425 may be bundled with client application 420 at the time of installation on the node that runs client application 420. In yet other embodiments, load balancing agent 425 is available on the node prior to installation of client application 420. Client application 420 may import load balancing agent 425 as a software module or library. In embodiments, a software environment (for example, a development environment or a runtime environment) imports load balancing agent 425 into client application 420 when client application 420 starts, in response to a command line argument in the environment to start client application 420. For example, if client application 420 is a Java program named exampleclient running in JRE, it may be started by the command:

exampleclient-javaagent:lb_strictroundrobin where # denotes the command prompt, exampleclient the name of the program to start, and -javaagent:lb_strictrepetitive is the command line argument (the switch) that causes JRE or JDK to import load balancing agent 425 found at the path lb_strictrepetitive into exampleclient.

An embodiment may employ several methods of interposing the load balancing agent between the client application and the cache. These include function overriding (or in Java: using a custom resolver), using Java reflection (or similar in another language), using a Java agent (or similar in another language), and in a Unix or Linux environment intercepting library calls. Function overriding means changing the implementation of a function in a parent class by reimplementing the function in an inheriting class. For example, in Java 8, applications are allowed to substitute a custom resolver for the name service; that resolver must implement the sun.net.spi.nameservice.NameService interface. The resolver may cache addresses from the standard or default DNS resolver and serve them in a strictly repetitive fashion. In Java 8, this approach requires no changes to the client application code; the custom code is bundled with the application (manually added to its class path), and an additional system property is set for the application. However, in some other languages it may require referring to the inherited class rather than to the parent class, which requires a small change in the client application code. In Java 11 and similar languages, an embodiment can use reflection to substitute the custom resolver by accessing private fields of the InetAddress (or similar) class. This technique requires the client application to be modified to instantiate the code to perform the reflection. Another method is using a Java agent to manipulate the bytecode to interpose the agent in front of the InetAddress (or similar) cache. This kind of bytecode weaving is standard for Java frameworks like JPA. It requires no code changes. It does require that a jar file containing the agent be available to the client application (although not necessarily in its class path). Library interception using LD_PRELOAD is a Unix/Linux operating system functionality that allows replacing a standard library by a custom library and therefore changing functionality. Since LD_PRELOAD is used in the operating system rather than in the client application, no change to the client application is needed. The functionality is invoked when instantiating an operating system session in which the client application is or will be installed, and it can be invoked by the following command line command:

LD_PRELOAD=$PWD/somecustom.so./clientapplication

Figure 5:
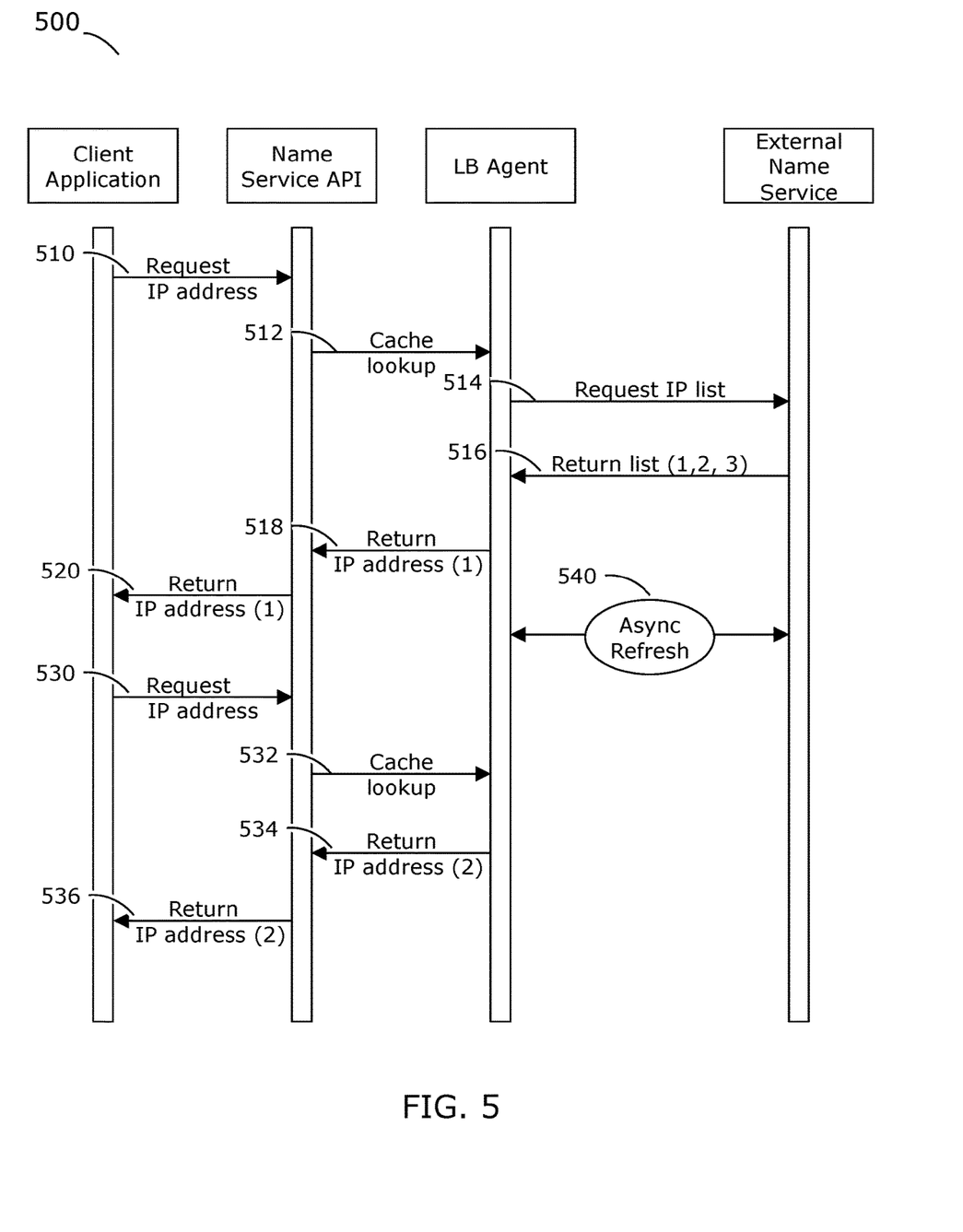
FIG. 5 illustrates a DNS resolution method according to an embodiment of the invention.

FIG. 5 illustrates a DNS resolution method 500 according to an embodiment of the invention. Resolution method 500 is based on client application 420, load balancing agent 425 interacting with a name service API in the runtime or development environment in which client application 420 and load balancing agent 425 run, and with external name service 430. Resolution method 500 comprises the following steps.

Step 510—in a name service API, receiving a first request from a client application to translate a URL into an IP address.

Step 512—upon receiving the first request, issuing a first cache lookup command to find the IP address for the URL in a cache memory.

Step 514—in a load balancing agent, intercepting the first cache lookup command and determining if the URL can be found in a cache memory controlled by the load balancing agent. Upon determining that the URL cannot be found in the cache memory controlled by the load balancing agent, issuing a request to an external name service to provide a list of IP addresses associated with the URL and obtaining the list of IP addresses of available servers associated with the URL from the external name service.

Step 516—in the load balancing agent, receiving the list of IP addresses associated with the URL from the external name service and storing the list of IP addresses associated with the URL in the cache memory, along with a pointer indicating which IP address has last been used, wherein the pointer identifies a first IP address on the list. In some embodiments, the pointer may indicate which IP address to use next, wherein the pointer identifies a second IP address from the list. Some embodiments store the list of IP addresses in the order it was received from the external name service. Other embodiments may reorder the list of IP addresses.

Step 518—returning the first IP address from the load balancing agent to the name service API.

Step 520—returning the first IP address from the name service API to the client application.

Step 530—in the name service API, receiving a subsequent request from the client application to translate the URL into an IP address.

Step 532—upon receiving the subsequent request, issuing a subsequent cache lookup command to find the IP address for the URL in the cache memory.

Step 534—in the load balancing agent, intercepting the subsequent cache lookup command and determining if the URL can be found in the cache memory controlled by the load balancing agent. Upon finding the URL, advancing the pointer indicating which IP address has last been used, wherein the pointer identifies a subsequent IP address on the list, and returning the subsequent IP address to the name service API. Some embodiments may, upon finding the URL, return the subsequent IP address from a location identified by the pointer indicating which IP address to use next, and advance the pointer indicating which IP address to use next. It should be clear to a person with ordinary skills in the art that embodiments may either use a pointer identifying the last used IP address or a pointer identifying the next IP address to use, and that either pointer will achieve the same end result. It should also be clear to the person with ordinary skills in the art that an embodiment may repetitively advance through the list in a linear fashion, incrementing or decrementing the pointer one step for each subsequent request (resulting in a strict cyclic progression through the list of IP addresses), or that an embodiment may repetitively advance through the list in any other fixed order, for example following a permutation of the list.

Step 536—returning the subsequent IP address from the name service API to the client application Step 540—in the load balancing agent, refreshing the list of IP addresses associated with the URL. The load balancing agent may do so asynchronously with receiving cache lookup commands from the name service API, for instance periodically. Some embodiments perform this step after each client application request or after each fixed number of client application requests.

Figure 6:
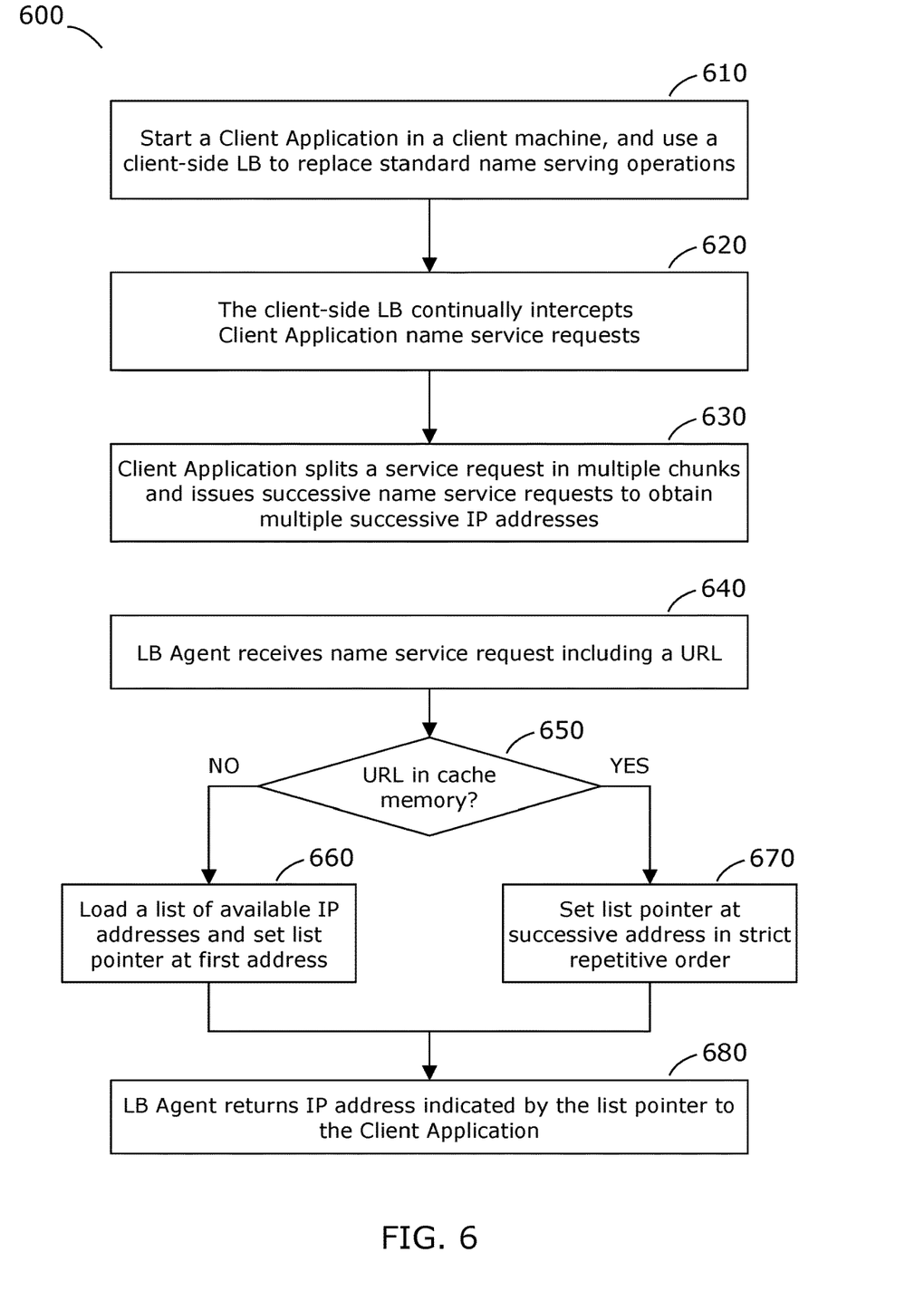
FIG. 6 illustrates a method of load balancing controlled in a client application according to an embodiment of the invention.

FIG. 6 illustrates a method 600 of load balancing controlled in a client application according to an embodiment of the invention. Method 600 comprises two interactive threads, wherein a first of the two interactive threads includes the following steps:

Step 610—starting a client application and using a client-side load balancer in a client machine and continually intercepting client application uses of a name serving function. The client-side load balancer provides operations that replace standard or default name serving operations. Some embodiments use a command line argument for the client application, and the command line argument causes the client application to use the client-side load balancer instead of a standard or default name serving function. The client-side load balancer may be a Java agent. In other embodiments, using the client-side load balancer is based on function overriding or using a custom resolver. In yet other embodiments, using the client-side load balancer is based on reflection. And in yet another embodiment, an operating system intercepts a library call to the standard or default name serving function and routes the library call to a custom library that comprises the client-side load balancer. In further embodiments, the client application and/or the client-side load balancer may operate in a Java environment.

Step 620—in the load balancing agent, continually intercepting name service requests issued by the client application. In some embodiments, the name service requests may comprise name service cache requests. The load balancing agent may process a request following steps Step 650 through Step 680.

Step 630—in the client application, splitting a service request in multiple chunks and issuing successive name service requests to obtain multiple successive IP addresses. In some embodiments, the name service requests may comprise name service cache requests.

And wherein a second of the two interactive threads includes the following steps:

Step 640—in the load balancing agent, receiving a name service request from the client application, wherein the name service request includes a URL.

Step 650—determining if the URL is stored in a cache memory.

Step 660—upon determining that the URL is not stored in the cache memory (it may be a first request for this URL, or a prior entry may have expired), loading a list of available IP addresses into the cache memory and setting a list pointer at a first address in the memory, wherein the first address in the memory stores a first available IP address.

Step 670—upon determining that the URL is already stored in the cache memory (it is a subsequent request for this URL), setting the list pointer at a successive address in the memory according to a strictly repetitive order, wherein the successive address in the memory stores a successive available IP address.

Step 680—returning either the first available IP address from Step 660 or the successive available IP address from Step 670 to the client application. The client application uses the first and successive available IP addresses to send the multiple chunks with service requests to at least a part of the available servers.

Figure 7:
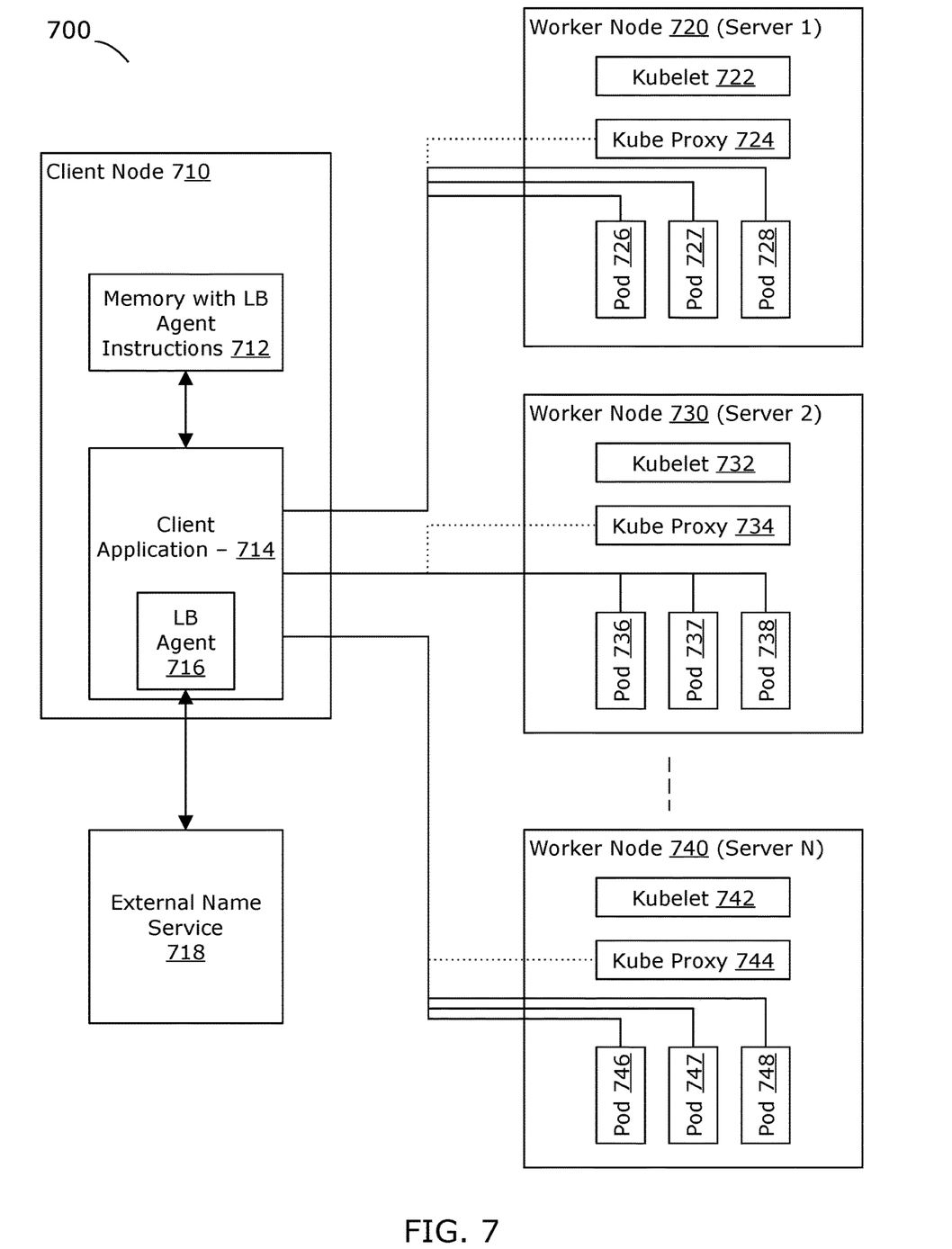
FIG. 7 illustrates a Kubernetes architecture for hosting software applications configured for servicing a client application according to an embodiment of the invention.

FIG. 7 illustrates a Kubernetes architecture 700 for hosting software applications configured for servicing a client application according to an embodiment of the invention. Kubernetes architecture 700 includes client node 710, worker node 720, worker node 730, and worker node 740. The worker nodes are generally located on separate physical servers to provide redundancy in case of machine failure. Client node 710 may be remote from the worker nodes, or may be in the same geographical location. Client node 710 is generally located on a physical server that is separate from the worker nodes. Client node 710 includes non-transitory memory 712 which may hold software with executable instructions for a load balancing agent. Client node 710 is configured to run a client application 714 and to run load balancing agent 716 "inside" of client application 714, that is, alongside and interacting with client application 714. Load balancing agent 716 is configured to interface with external name service 718.

Worker node 720 includes kubelet 722, kube proxy 724, pod 726, pod 727, and pod 728. The operation of Kubernetes worker nodes has been well described in the art and needs no further description here. Other worker nodes, such as worker node 730 and worker node 740 have similar contents as worker node 720, and their internal blocks in FIG. 7 follow similar reference numbering as worker node 720. While client application 714, load balancing agent 716, and external name service 718 interact with each other as described with reference to FIGS. 4-6, in an embodiment client application 714 uses the IP addresses obtained from load balancing agent 716 to directly interface with the pods on worker node 720, worker node 730, and worker node 740 rather than via kube proxy 724, kube proxy 734, and kube proxy 744. Following the methods described herein, load balancing agent 716 dispatches IP addresses in a strict repetitive order, for instance a strict Round Robin order, allowing client application 714 to send subsequent chunks of compute-intensive requests to successive, physically separate, servers that include the respective worker nodes.

Considerations

Although the description has been described with respect to particular embodiments thereof, these particular embodiments are merely illustrative, and not restrictive. For example, architectures may include any number of name service servers (such as DNS servers and LDAP servers) and any number of compute servers or worker hosts. Architectures have been depicted with a single client node and running a single client application, but in reality, architectures may include many client nodes and may serve many client applications at the same time, some of which comprise embodiments of the invention, others not. Worker nodes have been depicted with three pods, but may contain any number of pods.

Any suitable programming language can be used to implement the routines of particular embodiments including Java, JavaScript, C, C++, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular embodiments. In some particular embodiments, multiple steps shown as sequential in this specification can be performed at the same time.

Particular embodiments may be implemented in a tangible, non-transitory computer-readable storage medium for use by or in connection with the instruction execution system, apparatus, board, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A "computer" may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A tangible, non-transitory computer-readable storage medium including instructions adapted to direct a client machine to perform the following actions:
   in a Java Runtime Environment (JRE) or a Java Development Kit (JDK), importing a Java agent as a client-side load balancer at a start-up of a Java client application in response to a command line argument that includes: a command prompt, a name of the Java client application, and a switch command line that causes the JRE or JDK to import the client-side load balancer found at a path name into the Java client application;

partitioning, by the Java client application, a service request into multiple unit chunks of the service request and each unit chunk being for an individual pod of multiple pods on different server nodes in a cluster of server nodes, and issuing successive name service requests to obtain multiple successive IP addresses;

determining that the command line argument includes the switch command line to import a client-side load balancer;

based on the determining, using the client-side load balancer for the Java client application instead of using a default name service function, wherein the client-side load balancer is imported into the client application;

in the client-side load balancer, intercepting the successive name service requests;

in a cache memory controlled by the client-side load balancer, storing a list of IP addresses of available pods of the multiple pods of the server nodes, associated with a unified resource locator (URL) included in the multiple chunk units of the service request-and storing a pointer indicating an IP address of the list of IP addresses that has been last used or next to be used;

in response to each of the successive name service requests, returning a next IP address from the list in a strict repetitive order and based on a current position of the pointer indicating an IP address of the list of IP addresses, to send individual chunks of the multiple unit chunks of the partitioned service request directly to the respective pods rather than via network proxies, wherein each IP address is to a different respective pod of successive, physically separate server nodes of the server nodes; and after each iteration of returning the next IP address, moving the pointer to indicate an IP address that has been last used or a next IP address to be used for a subsequent name service request of the successive name service requests.

2. The storage medium of claim 1 wherein the repetitive order is a Round Robin order.

3. A system comprising a client machine including a non-transitory memory with first instructions for default name service operations and with second instructions for operation of a client-side load balancer wherein, the system comprises:

the client machine to run an operating system that is operable to:
  determine if a first condition is met, wherein the first condition comprises that a command line argument for a Java client application running in a Java Runtime Environment (JRE) or a Java Development Kit (JDK) includes a command prompt, a name of the Java client application, and a switch command line to import the client-side load balancer;
  upon determining that the first condition is not met, the operating system gives the Java client application access to the first instructions;
  upon determining that the first condition is met, the operating system gives the Java client application access to the second instructions, wherein the second instructions are not a part of the Java client application;

the client-side load balancer being operable to:
  store in a cache memory a list of available IP addresses of available pods of multiple pods of Kubernetes worker nodes on different nodes in a cluster of worker nodes, associated with a unified resource locator (URL) included in a first name service request from the Java client application and store a pointer indicating an IP address of the list of IP addresses that has been last used or next to be used;
  intercept successive name service requests each issued for one of multiple unit chunks of a service request partitioned by a Java client application, each unit chunk of the service request being for an individual pod of multiple pods on the different nodes in the cluster of worker nodes; and
  in response to each of successive name service requests from the Java client application, return a next IP address in the list in a strict repetitive order based on a current pointer position indicating an IP address of the list of IP addresses, send each of the successive name service requests directly to the respective pods rather than via kube proxies, wherein each IP address is to a different respective pod of successive, physically separate worker nodes of the worker nodes, and after each iteration of providing the next IP address, advance the pointer to indicate the last returned IP address or to a next IP address to be provided for a subsequent name service request.

4. The system of claim 3 wherein the first condition comprises that the operating system has been directed to replace a library for the Java client application.

5. The system of claim 3 wherein the repetitive order is a Round Robin order.

* * * * *

UNITED STATES PATENT AND TRADEMARK OFFICE
CERTIFICATE OF CORRECTION

PATENT NO. : 12,155,720 B2  
APPLICATION NO. : 17/160316  
DATED : November 26, 2024  
INVENTOR(S) : Oaks It is certified that error appears in the above-identified patent and that said Letters Patent is hereby corrected as shown below:

In the Specification

In Column 1, Line 35, delete "corn" and insert -- com --, therefor.

In Column 7, Line 64, delete "Ib" and insert -- lb --, therefor.

In Column 7, Line 66, delete "Ib" and insert -- lb --, therefor.

In Column 8, Line 2, delete "Ib" and insert -- lb --, therefor.

Signed and Sealed this  
First Day of April, 2025

Coke Morgan Stewart  
*Acting Director of the United States Patent and Trademark Office*